(12) United States Patent
Lin et al.

(10) Patent No.: US 8,493,752 B2
(45) Date of Patent: Jul. 23, 2013

(54) PRIMARY SIDE CURRENT CONTROLLER AND RELATED POWER SUPPLY

(75) Inventors: Chin-Yen Lin, Hsinchu County (TW); Min-Chu Chien, Hsinchu County (TW)

(73) Assignee: Noveltek Semiconductor Corp., Zhubei, Hsinchu County (TW)

( * ) Notice: Subject to any disclaimer, the term of this patent is extended or adjusted under 35 U.S.C. 154(b) by 423 days.

(21) Appl. No.: 12/901,578

(22) Filed: Oct. 11, 2010

(65) Prior Publication Data

US 2011/0228571 A1 Sep. 22, 2011

Related U.S. Application Data (60) Provisional application No. 61/315,003, filed on Mar. 17, 2010.

(51) Int. Cl.
*H02M 3/335* (2006.01)

(52) U.S. Cl.
USPC .................................. 363/21.13; 363/21.16

(58) Field of Classification Search
USPC ................ 363/21.12, 21.13, 21.16, 21.18, 97
See application file for complete search history.

(56) References Cited

U.S. PATENT DOCUMENTS

| 6,977,824 | B1* | 12/2005 | Yang et al. | 363/21.16 |
| 7,388,764 | B2* | 6/2008 | Huynh et al. | 363/21.16 |
| 2006/0034102 | A1* | 2/2006 | Yang et al. | 363/21.13 |
| 2008/0112193 | A1* | 5/2008 | Yan et al. | 363/21.08 |
| 2008/0123372 | A1* | 5/2008 | Yang | 363/21.16 |
| 2009/0262561 | A1* | 10/2009 | Mayell et al. | 363/21.12 |
| 2010/0085781 | A1* | 4/2010 | Saji et al. | 363/21.16 |

FOREIGN PATENT DOCUMENTS

TW  M365013  9/2009

* cited by examiner

*Primary Examiner* — Adolf Berhane
*Assistant Examiner* — Fred E Finch, III
(74) *Attorney, Agent, or Firm* — Winston Hsu; Scott Margo (57) ABSTRACT

A primary side current controller for a power supply is disclosed. The primary side current controller includes a waveform detection unit, a calculation unit, and a switching controller. The waveform detection unit is used for detecting a waveform signal of the power supply and generating a captured signal. The calculation unit is coupled to the waveform detection unit and used for generating a selected voltage according to the captured signal and a feedback signal of the power supply. The switching controller is coupled to the calculation unit and used for generating a modulation signal according to the selected voltage and the feedback signal.

13 Claims, 9 Drawing Sheets

PRIMARY SIDE CURRENT CONTROLLER AND RELATED POWER SUPPLY

CROSS REFERENCE TO RELATED APPLICATIONS

This application claims the benefit of U.S. Provisional Application No. 61/315,003, filed on Mar. 17, 2010 and entitled "PRIMARY SIDE CURRENT CONTROLLER FOR POWER SUPPLY" the contents of which are incorporated herein.

BACKGROUND OF THE INVENTION

1. Field of the Invention

The present invention relates to a primary side current controller and related power supply, and more particularly, to a primary side current controller and related power supply capable of providing a constant output current.

2. Description of the Prior Art

Power supplies that convert an alternating current (AC) mains voltage to a direct current (DC) voltage for use in integrated electronic devices, among other devices, are known. The power supplies are required to maintain the output voltage, current or power within a regulated range for efficient and safe operation of the electronic device. Switches that operate according to a pulse width modulation (PWM) control to maintain the output voltage, current, or power of the power supply within a regulated range are also known. These switches utilize an oscillator and related circuitry to vary the switching frequency of the switches, and therefore regulate the power, current or voltage that is supplied by the power supply.

In the power supply, it is important to control the output power by regulating the output within a tolerance level and by limiting the maximum output power. Ensuring a maximum power limit helps protect the power supply and connect circuits from damage. However, with increasing of the output voltage, the output current can increase to dangerous levels. It is difficult to control the output current remaining a specific range.

To regulate the output current of the power supply, there have been a number of patents disclosing current controlling methods and apparatuses described as followed.

U.S. Pat. No. 6,977,824 discloses a control circuit for controlling an output current at the primary side of a power converter. The current control circuit comprises a switching control circuit for generating a switching signal for switching a transformer and regulating an output of the power converter.

U.S. Pat. No. 6,972,969 discloses a system and method for controlling current limit with primary side sensing. The system and method control the current limit such that it is maintained within a small range for any acceptable input voltages, and causes the output voltage of a PWM controller to drop as the output load increases when the current limit is reached.

U.S. Pat. No. 7,388,764 discloses a primary side constant output current controller. The primary side constant output current controller comprise a transformer reset time detector, a calculator circuit, an error amplifier, a comparator, a gate drive module, and an oscillator. The transformer reset time detector computes a transformer reset time signal based on a feedback signal. The calculator circuit generates a combined signal by multiplying the transformer reset time signal by a current signal through a power switch. The error amplifier outputs a signal based on the difference between a reference signal and the combined signal. The comparator is configured to compare the combined signal and at least one ramp signal. The gate drive module generates a corresponding gate drive signal operable for properly turning on or off the power switch of the switching regulator. The oscillator generates the oscillator signal to include jitter generated signal digitally as opposed to using an analog technique.

SUMMARY OF THE INVENTION

It is therefore an objective of the present invention to provide a primary side current controller to provide a constant output current on a secondary side and avoid damaging related circuitry due to over output current of the power supply.

The present invention discloses a primary side current controller for a power supply. The primary side current controller comprises a waveform detection unit, a calculation unit and a switching controller. The waveform detection unit is used for detecting a waveform signal of the power supply and generating a captured signal. The calculation unit is used for generating a selected voltage according to the captured signal and a feedback signal of the power supply. The switching controller is used for generating a modulation signal according to the selected voltage and the feedback signal.

The present invention discloses a power supply. The power supply comprises a transformer and a primary side current controller. The transformer comprises a primary side coil and a secondary side coil. The primary side coil is used for providing a primary side current and a feedback signal in response to variation of an output current of the power supply. The secondary side coil is used for providing a secondary side current for the output current, wherein a ratio between the secondary current and the primary current is a constant. The primary side current controller comprises a waveform detection unit, a calculation unit and a switching controller. The waveform detection unit is used for detecting a waveform signal of the power supply and generating a captured signal. The calculation unit is used for generating a selected voltage according to the captured signal and a feedback signal of the power supply. The switching controller is used for generating a modulation signal according to the selected voltage and the feedback signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
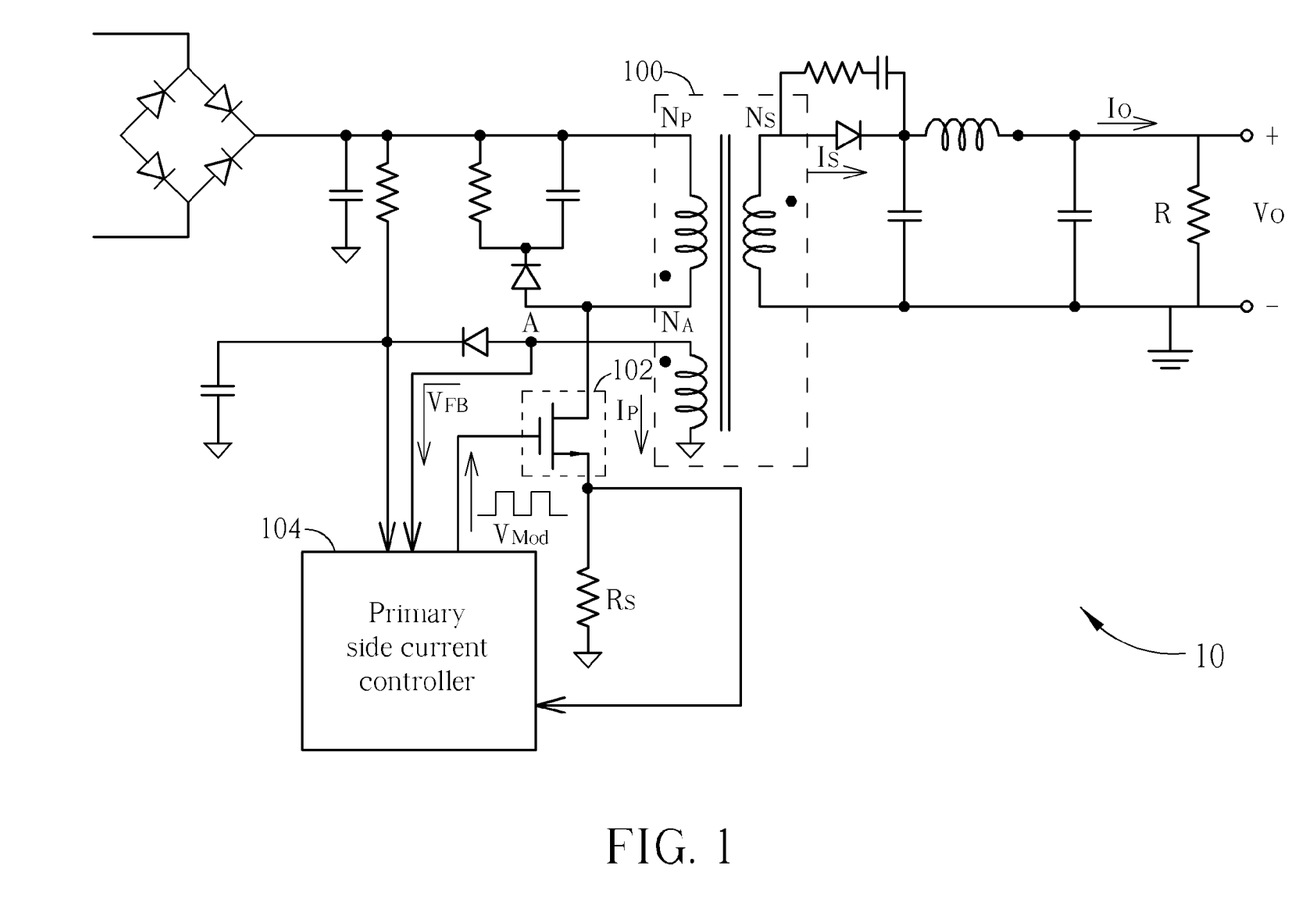
FIG. 1 is a schematic diagram of a power supply according to an example.

Please refer to FIG. 1, which is a schematic diagram of a power supply 10. The power supply 10 includes a transformer 100, a transistor 102, a primary side current controller 104, a resistor R and a current sensing resistor $R_S$. The power supply 10 provide an output voltage $V_O$ through the resistor R and an output current $I_O$ flowing through the resistor R. The transformer 100 has an auxiliary winding $N_A$, a primary winding $N_P$, and a secondary winding $N_S$. The primary winding $N_P$ is used for providing a primary side current $I_P$ and a feedback signal $V_{FB}$ in response to variation of an output current $I_O$. The feedback signal $V_{FB}$ is derived from a node A. The secondary side winding $N_S$ is used for providing a secondary side current $I_S$. A ratio between the secondary side current $I_S$ and the primary side current $I_P$ is a constant. The primary side controller 104 is coupled to the node A, the transistor 102, and the current sensing resistor $R_S$ and used for generating a modulation signal $V_{Mod}$ according to the feedback signal $V_{FB}$ and a waveform signal $V_X$. The modulation signal $V_{Mod}$ is, preferably, a pulse width modulation signal and used for turning on/off the transistor 102, thereby regulating the output current $I_O$. Any signal be able to control an on/off status of the transistor 102 is included within the scope of this disclosure. Since a duty cycle of the modulation signal $V_{Mod}$ determines the power delivered from the primary winding $N_P$ to the second winding $N_S$ of the transformer 100, the primary side current controller 104 regulates the output current $I_O$ by adjusting the duty cycle of the modulation signal $V_{Mod}$ after obtaining a feedback of the output current $I_O$ through the feedback signal $V_{FB}$. Preferably, the transistor 102 is an N type metal oxide semiconductor (NMOS), which has a drain electrode, a gate electrode and a source electrode. The drain electrode is coupled to the transformer 100. The gate electrode is coupled to the primary side current controller 104 for receiving the modulation signal $V_{Mod}$. The source electrode is coupled to the current sensing resistor $R_S$. When the transistor 102 is turned on by the modulation signal $V_{Mod}$, the primary winding $N_P$ generates the primary side current $I_P$ flowing through the current sensing resistor $R_S$. When the transistor 102 is turned off by the modulation signal $V_{Mod}$, the energy stored in the transformer 100 is delivered to the secondary winding $N_S$. This makes the secondary winding $N_S$ generate the secondary side current $I_S$. The current sensing resistor $R_S$ senses the primary side current $I_P$, thereby generating the waveform signal $V_X$ to the primary side current controller 104.

Figure 2A:
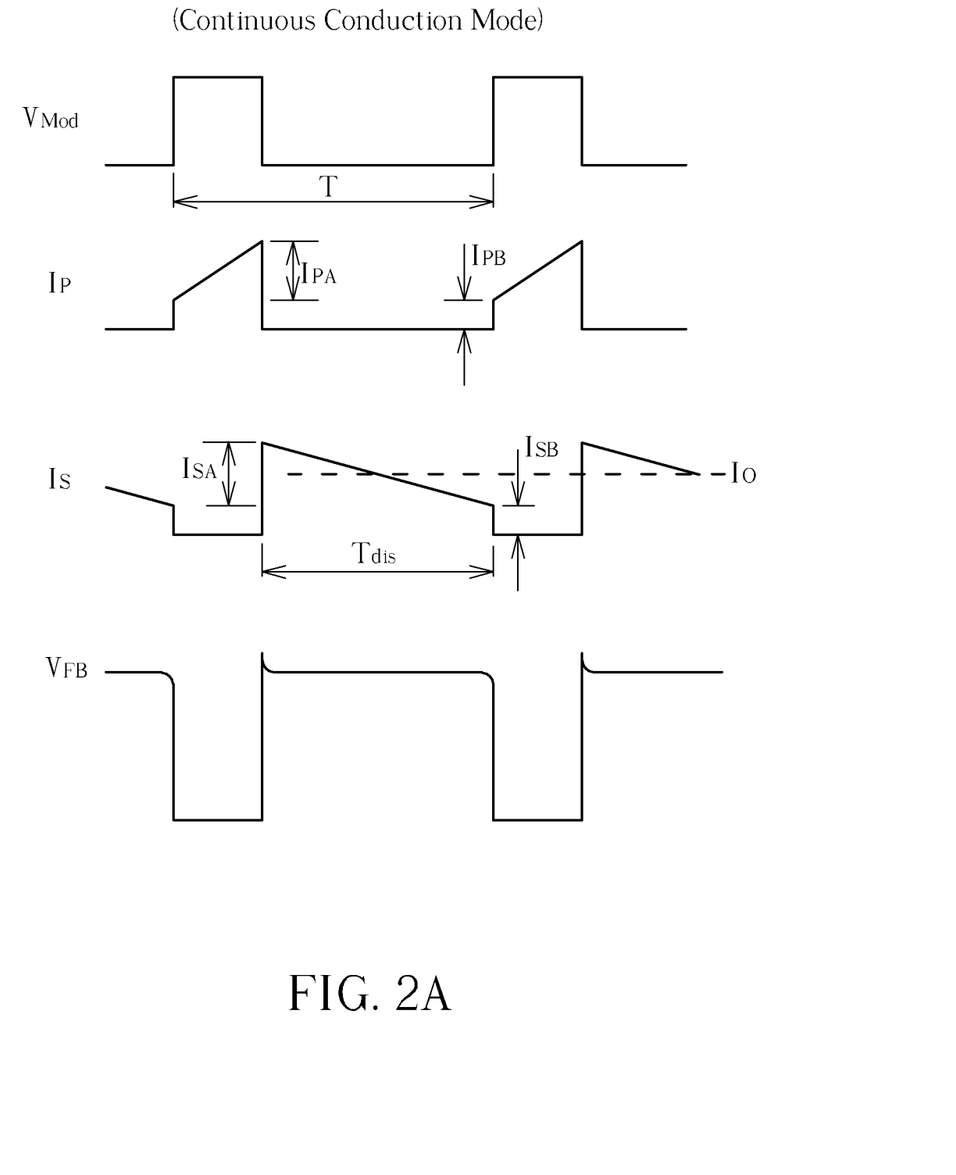
FIGS. 2A and 2B illustrate various signal waveforms of the power supply operating in a continuous conduction mode and a discontinuous conduction mode respectively according to FIG. 1.
Figure 2B:
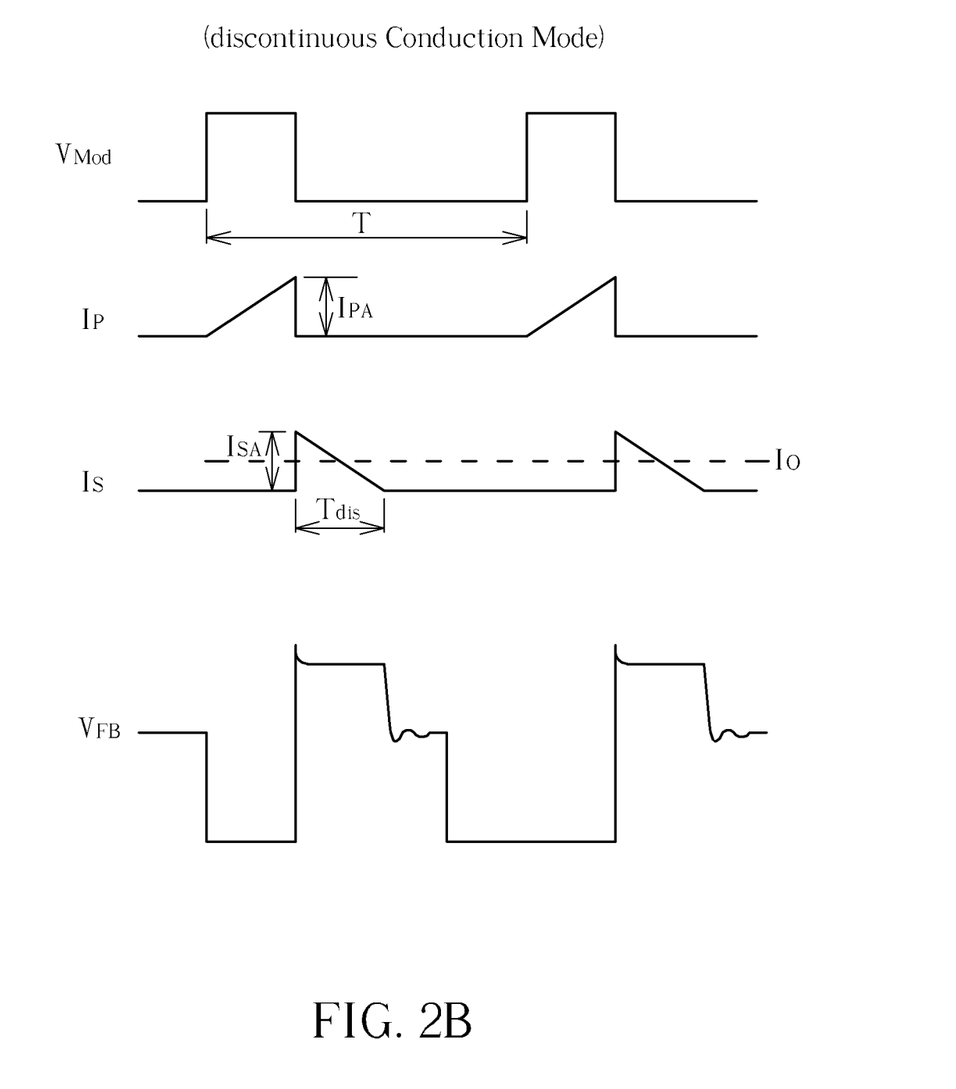

Please refer to FIGS. 2A and 2B, which illustrate various signal waveforms of the power supply 10 operating in a continuous conduction mode and a discontinuous conduction mode respectively. As shown in FIGS. 2A and 2B, the primary side current $I_P$ is generated when the modulation signal $V_{Mod}$ goes high. When the modulation signal $V_{Mod}$ drops low, the energy stored in the transformer 100 is delivered to the secondary side of the transformer 100. A secondary side current $I_S$ is determined by the primary side current $I_P$ and the winding turns $N_P$ and $N_S$ of the transformer 100. Therefore, the primary side current $I_P$ and the secondary side current $I_S$ satisfy the equation (1):

$$I_P = \frac{N_S}{N_A} I_S \quad (1)$$

$$I_{PA} = \frac{N_S}{N_P} I_{SA}, \quad I_{PB} = \frac{N_S}{N_P} I_{SB} \quad (2)$$

Where, $I_{PA}$, $I_{PB}$, $I_{SB}$ and $I_{BA}$ are current differences of the primary side current $I_P$ and the secondary side current $I_S$, respectively. As shown in FIG. 2B, $I_{PB}$ and $I_{SB}$=0 in the discontinuous conduction mode. The output current $I_O$ of the power supply 10 is the average of the secondary side current $I_S$. The output current $I_o$ of the power supply 10 is given by:

$$I_O = \left[ I_{SB} + \frac{1}{2} I_{SA} \right] * \frac{T_{dis}}{T} \quad (3)$$

Where, $T_{dis}$ is a discharge time; T is a period of the modulation signal $V_{Mod}$.

Figure 3A:
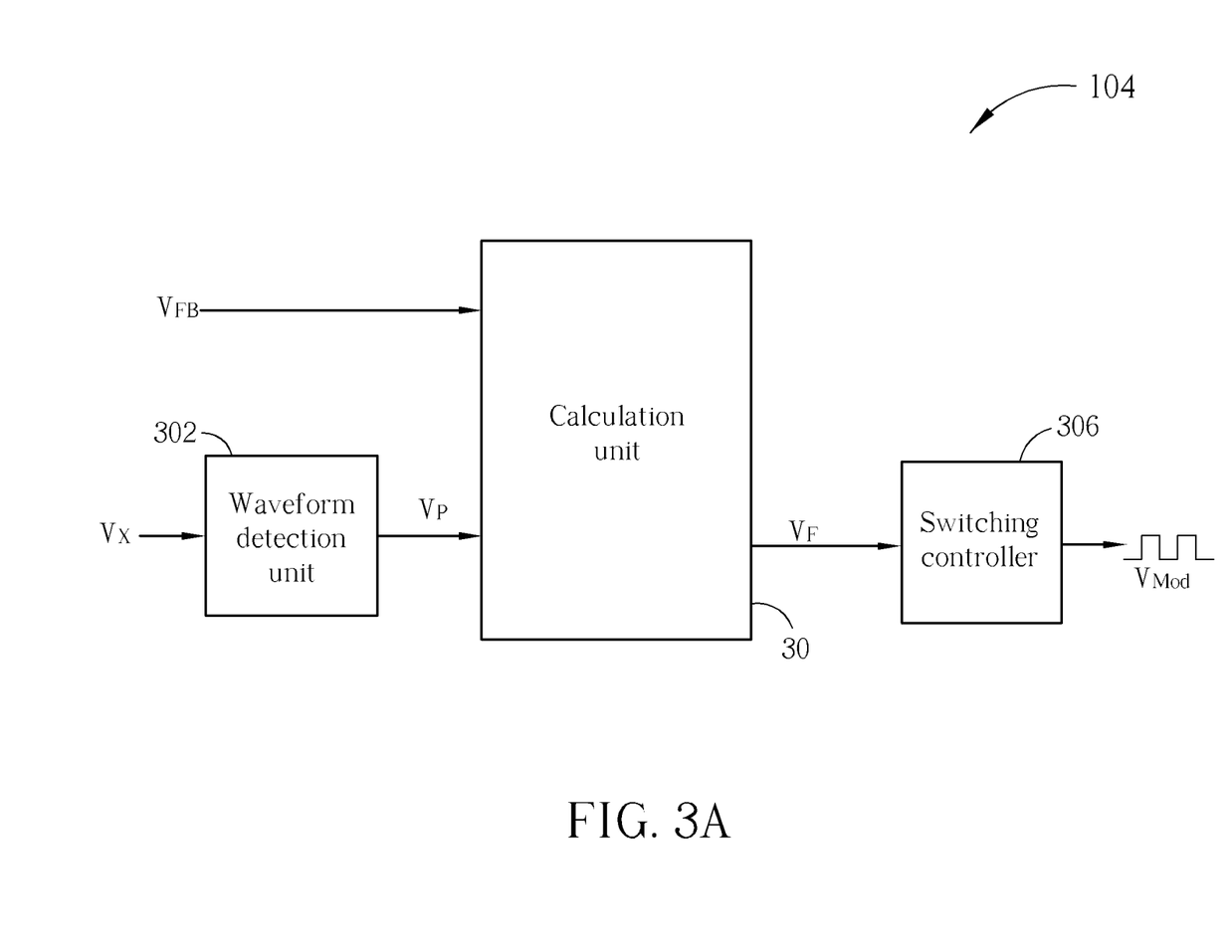
FIG. 3A is a block diagram of the primary side current controller according to FIG. 1.

Please refer to FIG. 3A, which is a block diagram of the primary side current controller 104 according to an example. The primary side current controller 104 includes a calculation unit 30, a waveform detection unit 302 and a switching controller 306. The waveform detection unit 302 is coupled to the current sensing resistor $R_S$ and used for detecting the waveform signal $V_X$ and generating a captured signal $V_P$. The calculation unit 30 is coupled to the waveform detection unit 302 and used for generating a selected voltage $V_F$ according to the captured signal $V_P$. The switching controller 306 is coupled to the calculation unit 30 and used for generating the modulation signal $V_{Mod}$ according to the selected voltage $V_F$ and the feedback signal $V_{FB}$.

Figure 3B:
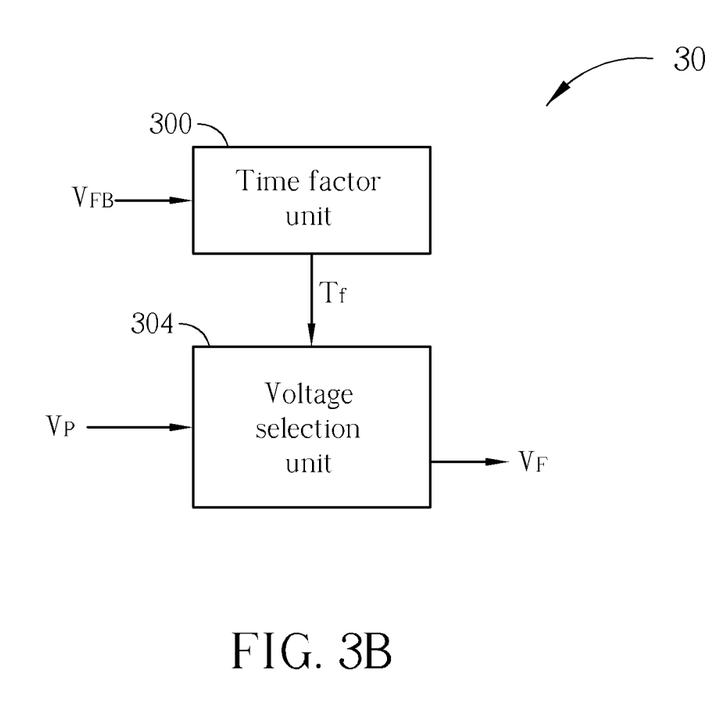
FIG. 3B is a block diagram of the calculation unit in FIG. 3A according to an example.

Please refer to FIG. 3B, which is a block diagram of the calculation unit 30 according to an example. The calculation unit 30 includes a time factor unit 300 and a voltage selection unit 304. The time factor unit 300 is used for detecting the discharge time $T_{dis}$ of the feedback signal $V_{FB}$ and the period T according to the feedback signal $V_{FB}$ and generating a time factor Tf. The time factor Tf can be represented by [$(T_{dis}/T)*K$], wherein K is a constant. The voltage selection unit 304 is coupled to the time factor unit 300 and the waveform detection unit 302, and used for generating the selected voltage $V_F$ according to the time factor Tf and the captured signal $V_P$. Preferably, the voltage selection unit 304 could be a digital-to-analog converter.

Therefore, the waveform detection unit 302 obtains the waveform signal $V_X$ by detecting the primary side current $I_P$ on the current sensing resistor $R_S$ and captures two voltage values $V_{PA}$ and $V_{PB}$ on the waveform signal $V_X$. Since the waveform signal $V_X$ is derived from the primary side current $I_P$ and given by ($V_X=R_s*I_P$), the voltage values $V_{PA}$ and $V_{PB}$ satisfy the equations [$V_{PA}=R_s*(I_{PB}+I_{PA})$] and ($V_{PB}=R_s*I_{PB}$). The captured signal $V_P$ can be substituted by $V_{PA}$ and $V_{PB}$ and represented by:

$$V_P = V_{PB} + \frac{V_{PA} - V_{PB}}{2} \qquad (4)$$

Further, $V_{PA}$ and $V_{PB}$ can be expressed by the current sensing resistor $R_S$, and current differences $I_{PA}$ and $I_{PB}$. Therefore, the equation (4) can be rewritten as:

$$V_P = R_S * \left(\frac{1}{2}I_{PA} + I_{PB}\right) \qquad (5)$$

Substituting the equation (2) into the equation (5):

$$V_P = R_S * \left(\frac{1}{2}\frac{N_S}{N_P}I_{SA} + \frac{N_S}{N_P}I_{SB}\right) \qquad (6)$$
$$= R_S * \frac{N_S}{N_P} * \left(\frac{1}{2}I_{SA} + I_{SB}\right)$$

Since the voltage selection unit 304 outputs a division voltage of the captured signal $V_P$ (e.g. selected voltage $V_F$), the selected voltage $V_F$ can be expressed by:

$$V_F = V_P * \frac{T_{dis}}{T} * K \qquad (7)$$

By substituting the equations (3) and (6) into the equation (7), the equation (7) can be rewritten as:

$$V_F = R_S * \frac{N_S}{N_P} * \left(\frac{1}{2}I_{SA} + I_{SB}\right) * \frac{T_{dis}}{T} * K \qquad (8)$$
$$= R_S * \frac{N_S}{N_P} * I_O * K$$

From the equation (8), the parameters $R_S$, $N_S$, $N_P$ and K are constants. It is understood that the selected voltage $V_F$ is positively proportional to the output current $I_O$ of the power supply 10. In other words, the primary side current controller 104 obtains the selected voltage $V_F$ positively proportional to the output current $I_O$ according to time factor unit 300, waveform detection unit 302 and voltage selection unit 304. Briefly, the output current $I_O$ is controlled by the selected voltage $V_F$. In addition, the switching controller 306 can include an error amplifier (not shown in FIG. 3), which has one input terminal coupled to the selected voltage $V_F$ and the other one coupled to a reference voltage $V_{ref}$. The error amplifier limits the maximum value of the selected voltage $V_F$ to the reference voltage $V_{ref}$. Via the equation (8), the maximum output current $I_{OMAX}$ can be denoted as $$\frac{V_{ref}}{K * R_S} * \frac{N_P}{N_S}.$$

Consequently, the maximum current $I_{OMAX}$ is clamped to a constant current related to the reference voltage $V_{ref}$. As a result, if the output voltage $V_O$ of the power supply 10 is over a tolerable voltage, the output current $I_O$ can be limited to the constant value to avoid damaging the power supply 10. In addition, the output current $I_O$ of a constant value can be applied to battery charging and related constant current elements, such as light-emitting diode (LED) lighting.

Figure 4A:
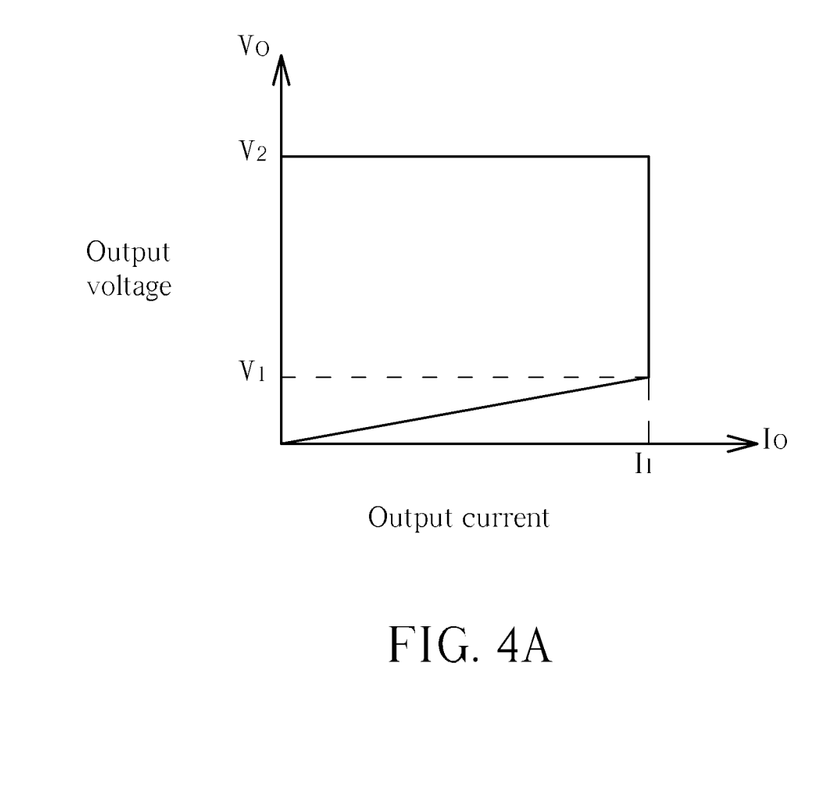
FIGS. 4A and 4B illustrate the output voltage of the power supply versus the output current of the power supply according to an example.
Figure 4B:
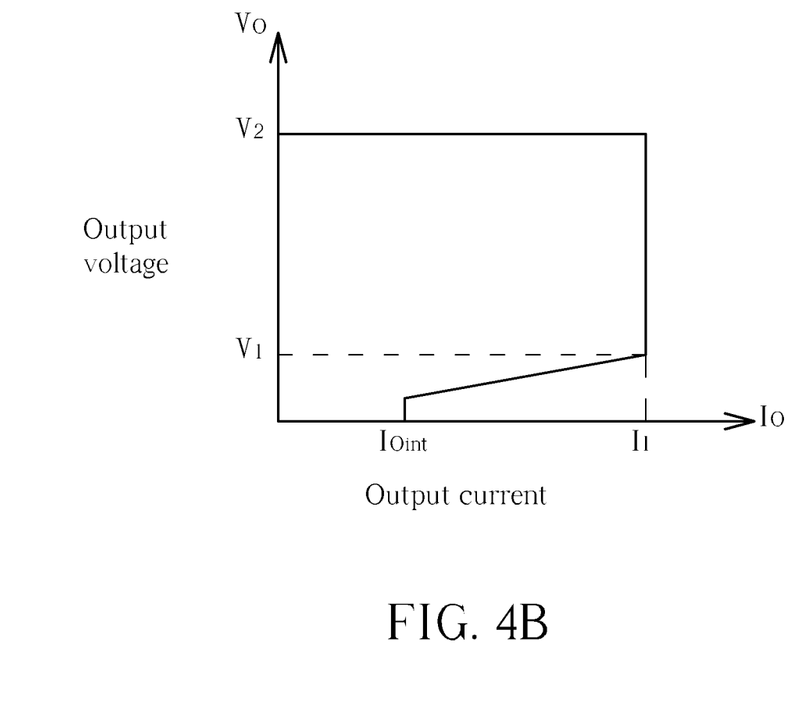

Please refer to FIGS. 4A and 4B, which illustrate the output voltage $V_O$ of the power supply 10 versus the output current $I_O$ of the power supply 10 according to an example of the present invention. In FIG. 4A, when the output voltage $V_O$ falls between the voltage V1 and 0, the output current $I_O$ decreases. When the output voltage $V_O$ falls between the voltage V1 and V2, the output current $I_O$ is clamped to a constant current I1. Preferably, the voltage V1 is a tolerable voltage of the output voltage $V_O$ for the power supply 10, and the voltage V2 is a stable output voltage of the power supply 10. When the output voltage $V_O$ exceeds the voltage V1, the output current $I_O$ of the power supply 10 is clamped to a constant current I1. When the output voltage $V_O$ exceeds the voltage V2, the power supply 10 outputs a stable voltage V2. This can prevent the power supply 10 from outputting too much power and damaging the internal or external circuitry. In FIG. 4B, the difference from the FIG. 4A is that the power supply 10 can provide an initial output current $I_{Oint}$ at zero output voltage.

Therefore, when the output voltage $V_O$ of the power supply 10 exceeds the tolerable voltage, the primary side current controller 104 can provide the constant output current $I_{OMax}$ for battery charging or constant current elements, and thereby avoid damage to power supply 10 due to over output current. Briefly, the primary side current controller 104 obtains the selected voltage $V_F$ proportional to the output current $I_O$ via the time factor 300, the waveform detection unit 302, and the voltage selection unit 304 and limits the selected voltage $V_F$ to the reference voltage $V_{ref}$. As a result, the maximum output current $I_{OMax}$ is limited to a constant and can be applied to battery charging and constant current elements.

In addition, the selected voltage $V_F$ can be used for cable compensation for the output voltage $V_O$ of the power supply 10. Since the power cable may have resistance, a voltage drop may be generated when the output current $I_O$ flows through the cable to the load, causing a small error in the output voltage $V_O$.

Figure 5:
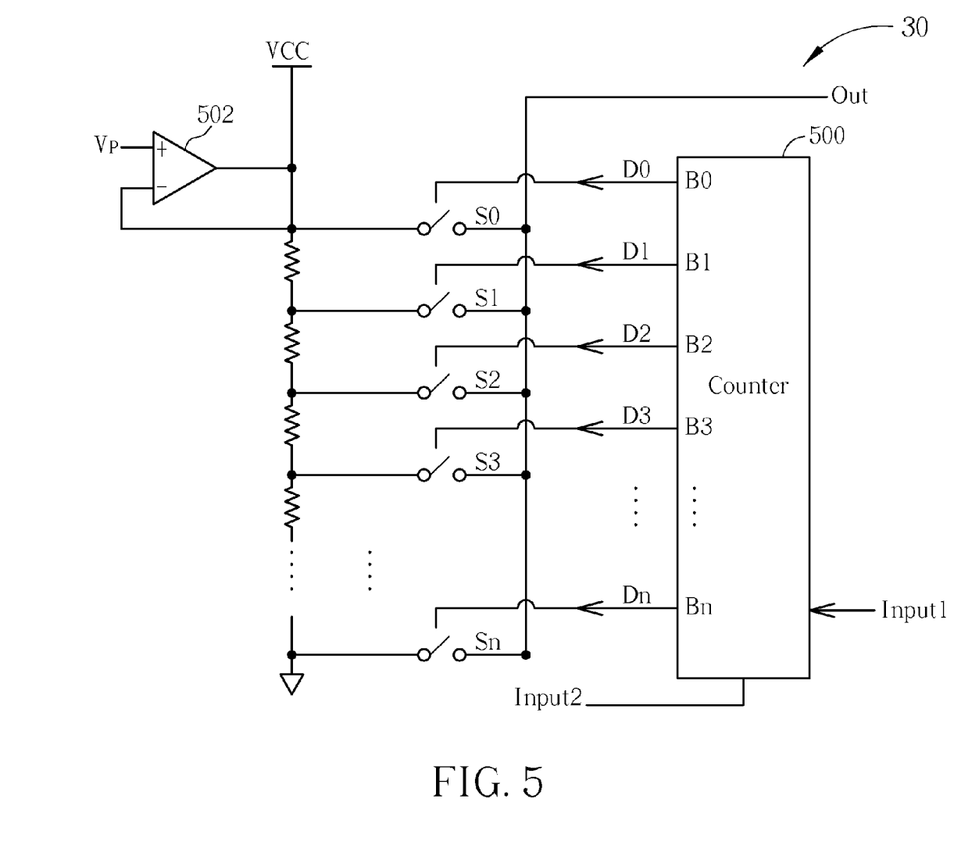
FIG. 5 illustrates the calculation unit in FIG. 3A according to another example.

In some examples, the calculation 30 may be carried out by a counter and multiple switches. Please refer to FIG. 5 which illustrates an implementation of the calculation unit 30 according to an example. As shown in FIG. 5, the calculation unit 30 includes a counter 500, an output terminal out, voltage division units R0, R1, R2, ... Rn, switches S0, S1, S2 ... Sn, and an amplifier 502. The counter 500 has input terminals input1 and input2 and digital output terminals B0, B1, B2, ... Bn. The input terminal input1 is used for receiving the period T. The input terminal input2 is used for receiving the discharge time $T_{dis}$. The digital output terminals Bo, B1, B2, ... Bn are used for outputting digital signals D0, D1, D2, ... Dn according to the period T and the discharge time $T_{dis}$. The output terminal out is used for outputting the selected voltage $V_F$. The switches S0, S1, S2 ... Sn are coupled to the output terminal out and the digital output terminals B0, B1, B2, ... Bn and turn on/off according to the digital signals D0, D1, D2, ... Dn. For example, when the digital signal D0 is "1", the switch S0 turns on. When the digital signal D0 is "0", the switch S0 turns off. The voltage division units R0, R1, R2, ..., Rn are coupled among the switches S0, S1, S2 ... Sn, and used for dividing the capture signal $V_P$ according to an on-off state of the switches S0, S1, S2 ... Sn. The voltage selection unit 304 performs voltage division on the captured signal $V_P$, in order to output the selected voltage $V_F$ satisfying the equation (6). Briefly, the counter 500 outputs a calculation result of $[(T_{dis}/T)*K]$ in digital and the digital signals D0, D1, D2, ... Dn through the digital output terminals B0, B1, B2, ... Bn to turn on/off the switches S0, S1, S2 ... Sn. Consequently, the voltage division units R0, R1, R2, ..., Rn divide the captured signal $V_P$ according to the on-off state of the switches S0, S1, S2 ... Sn and outputs the selected voltage $V_F$ satisfying the equation (6). Consequently, the calculation unit 30 can be implemented without any complicated circuit (e.g. integrator).

Figure 6:
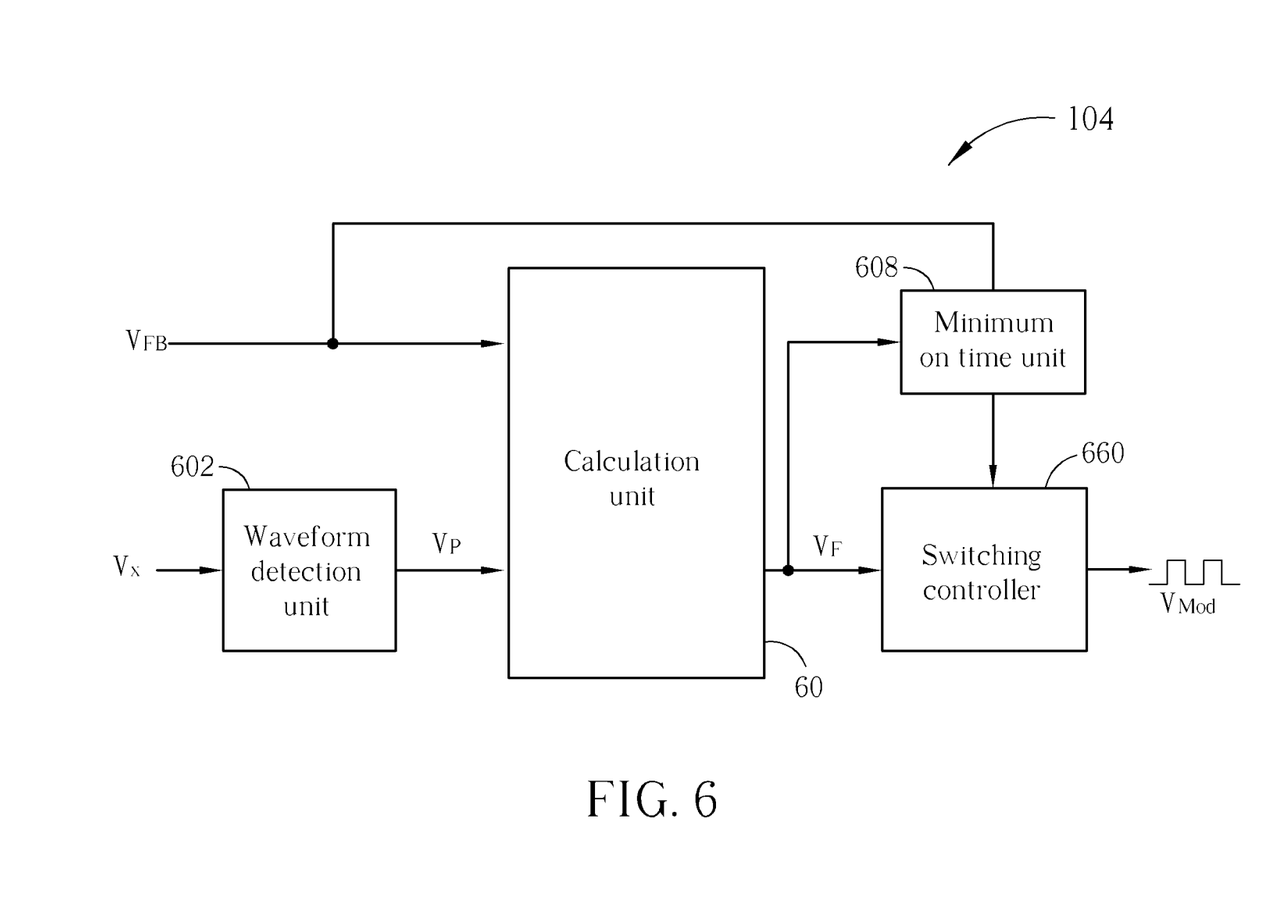
FIG. 6 is a schematic diagram of the primary side current controller in FIG. 1 according to another example.

Please refer to FIG. 6, which is a schematic diagram of the primary side current controller 104 according to another example. The primary side current controller 104 includes a calculation unit 60, a waveform detection unit 602, a switching controller 606, and a minimum on time unit 608. The calculation unit 60, a waveform detection unit 602, a switching controller 606 are identical or functionally similar to the calculation unit 30, the waveform detection unit 302 and the switching controller 306 shown in FIG. 3 respectively. Thus, the detailed description of those elements can be found above and omitted herein. The minimum on time unit 608 is added in FIG. 6. An output of the minimum on time unit 608 is coupled to the switching controller 606. A first input of the minimum on time unit 608 is coupled to the output of the calculation unit 60 for receiving the waveform signal $V_P$. The feedback signal $V_{FB}$ is fed to a second input of the minimum on time unit 608. The minimum on time unit 608 is used for adjusting the duty cycle of the modulation signal $V_{Mod}$ according to the output voltage $V_O$ and the feedback signal $V_{FB}$. When the smaller output voltage $V_O$ or output current $I_O$ is needed (less power demanding), the minimum on time unit 608 can dynamically adjust the duty cycle of the modulation signal $V_{Mod}$ to reduce the "ON-time" duration of the transistor 102. This can reduce redundant power consumption and allow the power supply 10 to meet wider requirements.

To sum up, the embodiments of the present invention use the primary side current controller to control the output current of the power supply. The output current is clamped to a constant current even if the output voltage exceeds the tolerable voltage. The constant current can be applied to battery charging and constant current elements (e.g. LED lighting). The power supply can avoid being damaged due to over current. In addition, the present invention uses the minimum on time unit to dynamically adjust the duty cycle of the modulation signal according to the output voltage and output current. Such that the redundant power consumption can be reduced and the power supply can be applied to more accurate power requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A primary side current controller for a power supply, the primary side current controller comprising:
   a waveform detection unit for detecting a waveform signal of the power supply and generating a captured signal;
   a calculation unit for generating a selected voltage according to the captured signal and a feedback signal of the power supply; and
   a switching controller for generating a modulation signal according to the selected voltage and the feedback signal,
   wherein the calculation unit comprises:
      a counter for providing a plurality of digital signals according to a period of the modulation signal and a discharge time of the feedback signal;
      a plurality of switches coupled to the counter and controlled by the digital signals;
      a plurality of voltage division units for coupling the switches and dividing the captured signal according to an operation of the switches to make the calculation unit provide the selected voltage.

2. The primary side current controller of the claim 1, wherein the calculation unit comprises:
   a time factor unit for detecting a discharge time of the feedback signal according to the feedback signal and generating a time factor, wherein the feedback signal varies in response to an output current; and
   a voltage selection unit coupled to the time factor and the waveform detection unit, for dividing the captured signal according to the time factor to generate the selected voltage.

3. The primary side current controller of the claim 2, wherein the time factor is given by the discharge time divided by a period of the modulation signal.

4. The primary side current controller of the claim 2, wherein the voltage selection unit is a digital-to-analog converter.

5. The primary side current controller of claim 1 further comprising:
   a first input terminal coupled to the feedback signal;
   a second input terminal coupled to the calculation unit, for receiving the selected voltage; and
   an output terminal coupled to the switching controller, for outputting an adjusting signal, wherein the adjusting signal is used for adjusting a duty cycle of the modulation signal.

6. The primary side current controller of claim 1, wherein the selected voltage is used for cable compensation of an output voltage.

7. The power supply of claim 1, wherein the selected voltage is used for cable compensation for an output voltage.

8. A power supply comprising:

a transformer comprising:
- a primary side winding for providing a primary side current and a feedback signal in response to variation of an output current of the power supply; and
- a secondary side winding for providing a secondary side current for the output current, wherein a ratio between the secondary current and the primary current is a constant; and a primary side current controller for controlling the output current, the primary side current controller comprising:
- a waveform detection unit for detecting a waveform signal of the power supply and generating a captured signal;
- a calculation unit for generating a selected voltage according to the captured signal and a feedback signal of the power supply; and
- a switching controller for generating a modulation signal according to the selected voltage and the feedback signal, wherein the calculation unit comprises:
- a counter for providing a plurality of digital signals according to a period of the modulation signal and a discharge time of the feedback signal;
- a plurality of switches coupled to the counter and controlled by the digital signals;
- a plurality of voltage division units for coupling the switches and dividing the captured signal according to an operation of the switches to make the calculation unit provide the selected voltage.

9. The power supply of the claim 8, wherein the calculation unit comprises:
- a time factor unit for detecting a discharge time of the feedback signal according to the feedback signal and generating a time factor; and
- a voltage selection unit coupled to the time factor and the waveform detection unit, for dividing the captured signal according to the time factor to generate the selected voltage.

10. The power supply of the claim 9, wherein the time factor is given by the discharge time divided by a period of the modulation signal.

11. The power supply of the claim 9, wherein the voltage selection unit is a digital-to-analog converter.

12. The power supply of claim 8 further comprising:
- a first input terminal coupled to the feedback signal;
- a second input terminal coupled to the calculation unit, for receiving the selected voltage; and
- an output terminal coupled to the switching controller, for outputting an adjusting signal, wherein the adjusting signal is used for adjusting a duty cycle of the modulation signal.

13. The power supply of claim 8 further comprising a transistor having a first terminal coupled to the transformer, a second terminal coupled to the switching controller for receiving the modulation signal and a third terminal coupled to a current sensing resistor for providing the primary side current to the current sensing resistor.

* * * * *